United States Patent
Korcz et al.

(10) Patent No.: US 8,674,219 B2
(45) Date of Patent: Mar. 18, 2014

(54) MOUNTING CLIP FOR ELECTRICAL DEVICE

(75) Inventors: Krzysztof W. Korcz, Granger, IN (US); Mahran H. Ayrton, South Bend, IN (US); Richard J. Wagner, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 13/286,657

(22) Filed: Nov. 1, 2011

(65) Prior Publication Data
US 2013/0105474 A1     May 2, 2013

(51) Int. Cl.
H02G 3/08     (2006.01)

(52) U.S. Cl.
USPC .............. 174/50; 174/53; 248/906; 439/535

(58) Field of Classification Search
USPC ............. 174/53, 50; 220/3.2, 4.02; 411/548; 439/535; 248/906; 361/600
See application file for complete search history.

(56) References Cited

U.S. PATENT DOCUMENTS

| | | | |
|---|---|---|---|
| 3,375,749 A | | 4/1968 | Coldren et al. |
| 3,723,942 A | * | 3/1973 | Dennison ................ 439/97 |
| 3,955,463 A | * | 5/1976 | Hoehn ................ 411/548 |
| 4,012,580 A | * | 3/1977 | Arnold ................ 174/53 |
| 4,059,328 A | * | 11/1977 | Rigo ................ 439/535 |
| 4,281,773 A | * | 8/1981 | Mengeu ................ 220/3.2 |
| 4,306,109 A | * | 12/1981 | Nattel ................ 174/51 |
| 4,315,100 A | * | 2/1982 | Haslbeck et al. ................ 174/51 |
| 4,392,012 A | * | 7/1983 | Nattel ................ 174/51 |
| 4,424,405 A | * | 1/1984 | Nattel ................ 174/53 |
| 4,925,351 A | | 5/1990 | Fisher |
| 4,936,396 A | | 6/1990 | Lockwood |
| 4,960,964 A | * | 10/1990 | Schnell et al. ................ 174/51 |
| 5,057,649 A | * | 10/1991 | Ring ................ 174/53 |
| 6,174,118 B1 | | 1/2001 | Rebers et al. |
| 7,096,638 B2 | | 8/2006 | Osterland et al. |
| 7,168,138 B2 | | 1/2007 | Lubera et al. |
| D576,029 S | | 9/2008 | Kato et al. |
| 7,468,486 B2 | | 12/2008 | Yan |
| 7,496,993 B2 | | 3/2009 | Kosidlo et al. |
| 7,568,870 B2 | | 8/2009 | Paquet |
| 2008/0154281 A1 | | 6/2008 | Schaffran et al. |
| 2009/0087279 A1 | | 4/2009 | McGinn et al. |

* cited by examiner

*Primary Examiner* — Dhirubhai R Patel
(74) *Attorney, Agent, or Firm* — Garrett V. Davis; Mark S. Bicks; Alfred N. Goodman

(57) ABSTRACT

An electrical assembly includes a wiring device and an insert clip member that can be preassembled to provide quick connection to an electrical box, mud ring or other support structure having an aperture with a dimension to receive the clip member. The clip member can couple to the mounting screws of the working device and can be snapped into an aperture in a mud ring to align the screws with the threaded holes in the electrical box. The clip has a U-shape with outwardly projecting tabs that engage the aperture in the mud ring and inwardly extending tabs that engage the mounting screws of the wiring device. The tabs allow the mounting screws to be pressed into the clip in a sliding or ratcheting manner and allow the clip to snap into the aperture in the mud ring.

24 Claims, 7 Drawing Sheets

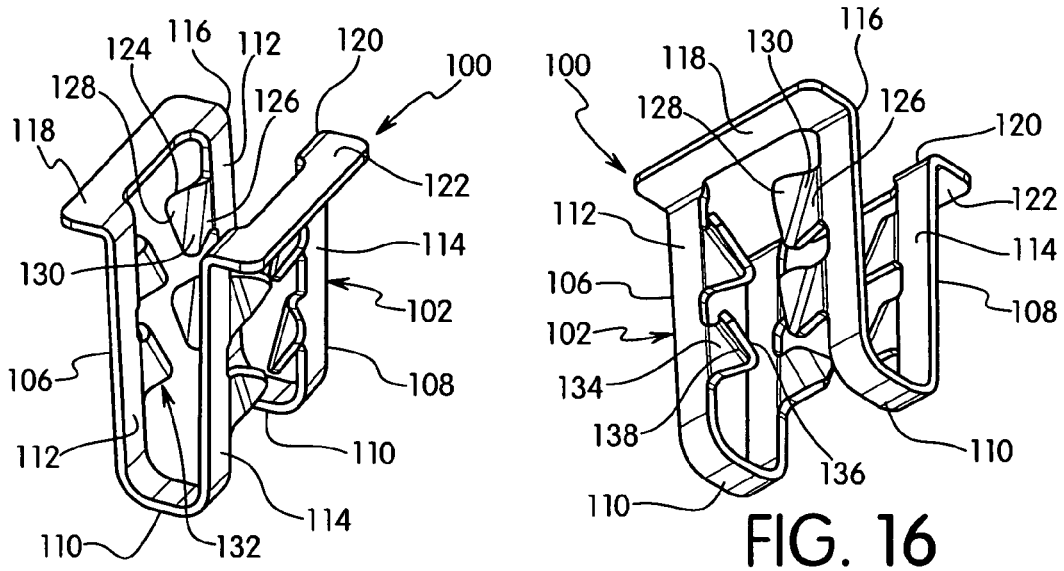
FIG. 15
FIG. 16
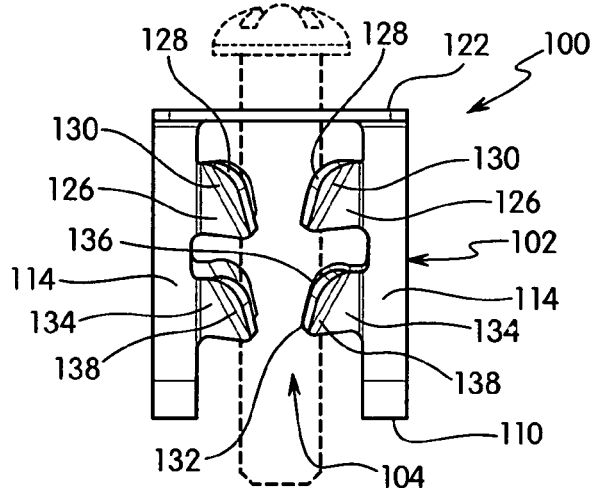
FIG. 17
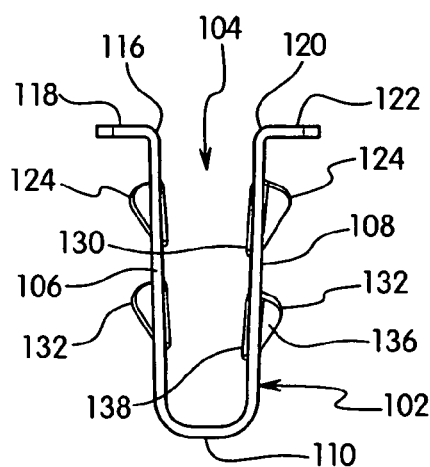
FIG. 18
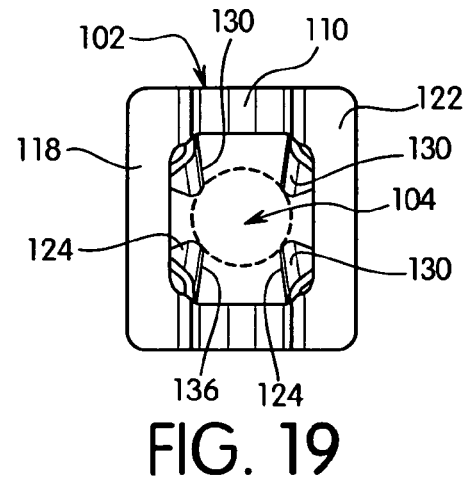
FIG. 19

MOUNTING CLIP FOR ELECTRICAL DEVICE

FIELD OF THE INVENTION

The present invention is directed to a mounting clip for coupling the electrical device to an electrical box. The invention is further directed to a clip providing a snap connection for an electrical device to a mud ring or other support surface on an electrical box.

BACKGROUND OF THE INVENTION

Electrical boxes often require the use of a mud ring or extension to position the electrical wiring device at the desired location with respect to the wall surface. The mud ring can have threaded screw holes to receive the mounting screws of the wiring device. Alternatively, the mud ring can have apertures that allow the screws to pass through to enable the screws to thread into the screw holes in the electrical box.

Various clips have been proposed that can be inserted into an aperture in a structure and have a passage for receiving a screw or other fastener. Many of these clips are made from spring steel.

For example, U.S. Patent Publication No. 2009/0087279 to McGinn et al. discloses a spring clip for connecting the screws of an electrical device to the cover plate of an electrical box. The spring clip can be connected directly to the inner face of the cover plate so the screw can slide through the opening in the spring clip.

U.S. Pat. No. 5,057,649 to Ring discloses an electrical wiring box with a tab and flange for mounting the electrical device. A spring clip is mounted to the outer surface of the flange for receiving the screws on the electrical device. The spring clip has inwardly extending legs to engage the threads on the screws.

U.S. Pat. No. 4,936,396 to Lockwood discloses an electrical box having inwardly extending columns with an aperture for receiving the screws of an electrical device. A spring clip is snapped into the opening. The spring clip includes legs with outwardly extending tabs to retain the spring clip in the aperture and inwardly extending tabs to engage the threads of the screw.

U.S. Pat. No. 7,568,870 to Paquet discloses a push nut that is received in the opening of a plate. The push nut includes an axial passage with inwardly extending legs for receiving the threads of a screw. Outwardly extending legs project outwardly to engage the inner surface of the plate and to couple the push nut to the plate.

U.S. Pat. No. 7,468,486 to Yan relates to an adjustable mud ring system. The device includes a frame attached to the electrical box and a movable extending member. The extending member has tabs with threaded holes so that an electrical receptacle can be attached directly to the tabs.

While these devices are generally suitable for the intended purpose, there is a continuing need in the industry for improved devices for attaching an electrical wiring device to an electrical box.

SUMMARY OF THE INVENTION

The present invention is directed to an electrical assembly that can quickly and easily be assembled on the work site with minimal effort. The invention is particularly directed to an electrical wiring device having mounting screws and a clip member so that the wiring device can be quickly coupled to an electrical box, mud ring or mounting surface.

Accordingly, one feature of the invention is to provide an electrical wiring device that can be snapped onto an opening in a mud ring or other support surface either before or after the mud ring is coupled to the electrical box. A spring clip member is included to couple the wiring device to the mud ring. The mounting screws on the wiring device can be aligned with the screw holes in the electrical box for easy threading of the screws into the screw holes to couple the wiring device securely to the electrical box.

Another feature of the invention is to provide a mud ring or other support member having a clip member coupled thereto to enable an electrical wiring device to be quickly attached to the mud ring. The clip member and mud ring can be produced as a preassembled unit. The wiring device and the mud ring can form a preassembled unit that can then be coupled to the electrical box.

A further aspect of the invention is to provide a clip member formed as a one piece unit for coupling a wiring device to a mud ring.

Another feature of the invention is to provide a clip member for coupling a wiring device to a mounting surface, mud ring or electrical box that can be produced inexpensively and is easy to install. The clip member is made from a flexible and resilient metal to provide a snap coupling to the mounting screws of the electrical device and to the mud ring or other support member.

The clip member of the invention is preferably a one piece integrally formed member made from a spring steel. In one embodiment, the spring clip is made from pre-tempered stainless steel. The clip member has a body with an axial passage for the mounting screw and a coupling member for coupling the clip member to a mounting surface, mud ring or electrical box.

The body of the clip member has a generally U-shape with a top end and bottom end formed with a first portion and a second portion connected together by a curved bottom portion. The bottom portion has an open area to define an axial passage to allow the mounting screw of an electrical wiring device to pass through. Tabs are provided to engage the mounting screw and to engage the mounting surface. The tabs are sufficiently resilient to provide a snap connection.

Another feature of the invention is to provide a clip member having a U-shaped body portion with at least one inwardly extending tab for coupling with a mounting screw of an electrical wiring device. The body portion also has an outwardly extending tab for engaging an opening in a mud ring.

These and other aspects of the invention are basically attained by providing an electrical wiring device comprising an electrical wiring device having at least one mounting screw for coupling the wiring device to an electrical box and a one piece clip member. The clip member has an axial passage receiving the at least one mounting screw, and an outwardly extending tab adapted for coupling with an aperture in an electrical box.

The features are further attained by providing an electrical assembly comprising an electrical box having an open end and at least one coupling tab having a screw hole and a mounting member adapted for coupling to the open end of the electrical box. The mounting member has a mounting surface with an aperture aligned with the screw hole. An insert is adapted for being received in the aperture and has an axial passage. The electrical assembly has an electrical device with a mounting screw received in the axial passage of the insert. The insert is positioned to align the mounting screw with the screw hole in the electrical box.

The various features of the invention are further attained by providing a one piece integrally formed insert clip member comprising a substantially U-shaped body having a first leg portion and a second leg portion. Each of the first portion and second portion have a top end and bottom end, and a connecting portion extending between the bottom end of the respective first and second leg portions. An axial passage extends through the bottom connecting portion and between the leg portions. A top flange member extends outward from the top end of each of the first and second leg portions. At least one outwardly extending tab on the body is adapted for coupling the insert clip member with an aperture in a support structure. At least one inwardly extending tab extends into the axial passage and is adapted for coupling a screw to the insert clip member.

The features of the invention are still further attained by providing a method of assembling an electrical assembly, the method comprising the steps of providing an electrical wiring device having a mounting screw, coupling an insert member to the mounting screw, and coupling the insert member in an aperture in a collar for an electrical box.

The various objects and features of the invention will become apparent from the following detailed description of the invention which, in conjunction with the annexed drawings, disclose various embodiments of the invention.

BRIEF DESCRIPTION OF THE DRAWINGS

The following is a brief description of the drawings, in which:

FIG. 15 is a top perspective view of the clip member of FIG. 10;

FIG. 16 is a bottom perspective view of the clip member of FIG. 11;

FIG. 17 is a side view of the clip member of FIG. 11;

FIG. 18 is an end view of the clip member of FIG. 11; and

FIG. 19 is a top view of the clip member of FIG. 11.

DETAILED DESCRIPTION OF THE INVENTION

Figure 1:
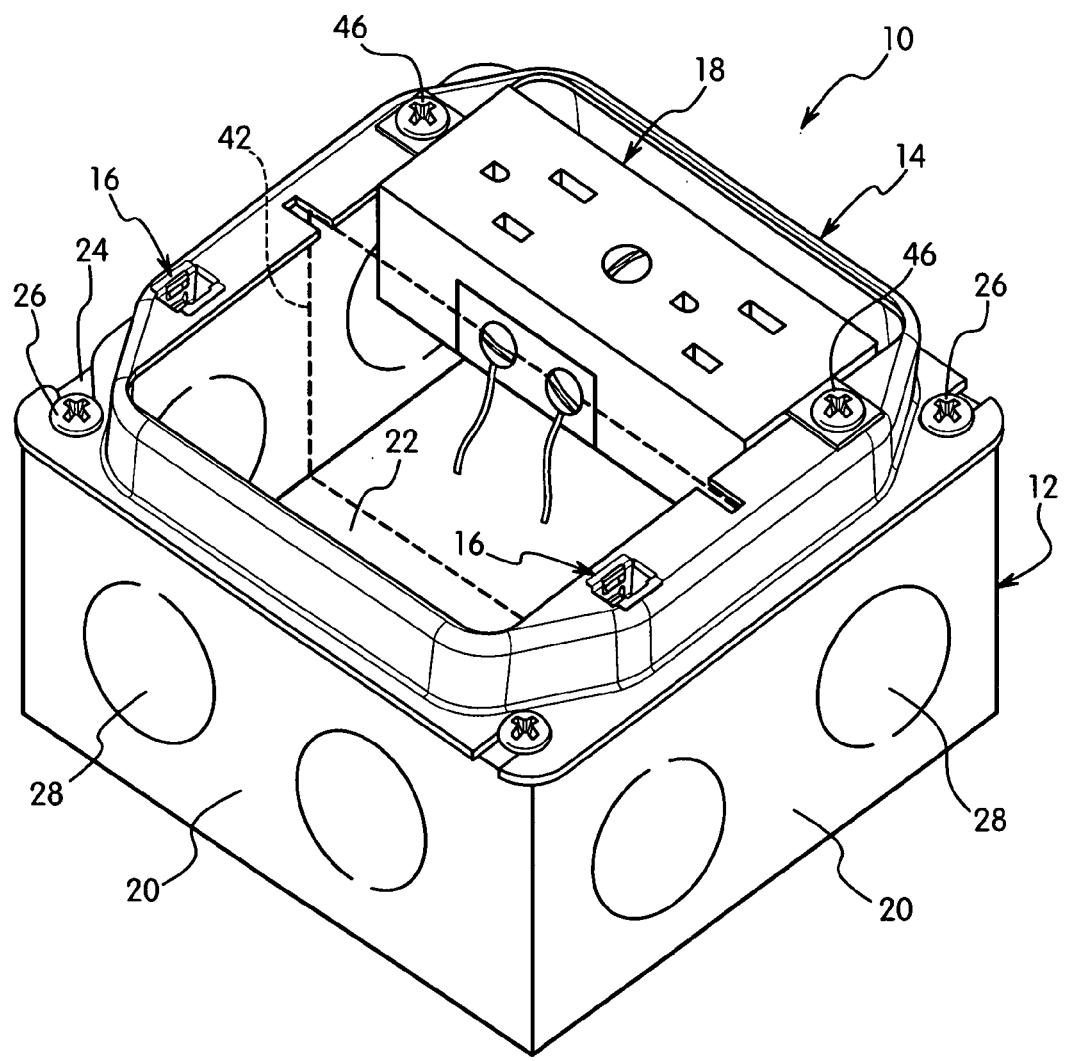
FIG. 1 is a perspective view of the electrical assembly in a first embodiment of the invention showing the electrical box, mud ring, clip member and electrical wiring device.

The present invention is directed to an electrical assembly for mounting an electrical wiring device such as a duplex receptacle to an electrical box, mud ring or other support member. The invention is particularly directed to a mounting device for attaching an electrical wiring device to a mounting surface, an electrical box or a mud ring attached to the electrical box. The mounting device in the embodiments shown and described is a spring clip member. The assembly according to the invention enables quick and efficient mounting of the electrical wiring device.

Referring to the drawings, the electrical assembly 10 in a first embodiment of the invention includes an electrical box 12, an extension plate, commonly referred to as a mud ring 14, a mounting clip member 16 forming an insert and an electrical wiring device 18. The mud ring 14 defines a mounting member having a support surface for receiving and supporting the electrical wiring device 18 and for coupling to the electrical box. The mud ring 14 forms an extension or collar to space the wiring device from the top edge of the electrical box. In the embodiment shown, the wiring device 18 is a duplex receptacle. Alternatively, the wiring device can be a switch, a ground fault circuit interrupter, or other electrical component.

The electrical box 12 in the embodiment shown has a square configuration with an open top end, side walls 20 and a bottom wall 22. The top edge of the side walls include a mounting tab 24 with a threaded hole for receiving a coupling screw 26. The side walls 20 can include one or more knockouts 28 or pry-outs to feed electrical wiring to the electrical box as known in the art. The electrical box 20 in the embodiment shown is a two gang box having a square configuration. The invention is suitable for use with a single gang or multi gang box. The electrical box can have a round shape, rectangular shape or other shape as known in the art. The electrical box as shown is a conventional electrical box as known in the art.

The mud ring 14 has a shape and dimension corresponding to the electrical box 12. In the embodiment shown, the mud ring 14 is a two gang unit. Alternatively, the mud ring can be a single gang or multi gang unit corresponding to the size of the electrical box. In the embodiment shown, the mud ring is used to exemplify the features of the invention for mounting a wiring device. The assembly of the invention is suitable for use with other mounting surfaces or electrical box extensions and collars that are adapted for mounting and supporting an electrical wiring device.

The mud ring in the embodiment shown includes a bottom plate 30 having slots 32 in each of the respective corners for receiving the screw 26 to couple the mud ring to the electrical box. A side wall 34 extends perpendicular from the bottom plate 30 a distance corresponding to the thickness of the wall surface. The electrical box 12 is generally mounted to a wall stud or other support surface having a wall substrate attached to the wall stud. The mud ring 14 extends through an opening cut in the wall surface so that the top end of the side wall is substantially flush with the outer surface of the wall surface. The side wall defines a collar that extends from the electrical box to position the electrical wiring device at a desired position with respect to the wall.

The side wall 34 of the mud ring 14 is continuous and forms a central opening 36 for receiving the wiring device 18. The side wall 34 includes an inwardly extending mounting flange 38 at opposite ends for supporting the wiring device 18. A notch 40 is formed in the mounting flanges 38 to receive a divider plate 42. The divider plate 42 forms two separate compartments within the electrical box for isolating the wiring and the wiring devices from each other. The mounting flanges 38 also include mounting holes 44 for receiving the mounting clip 16. The holes 44 are aligned on the opposite mounting flanges corresponding to the mounting screws 46 of the wiring device. The holes 44 have a shape and dimension corresponding to the outer dimension of the mounting clip member 16.

The mounting clip member 16 is adapted to be received within the mounting holes 44 in the mounting flange 38 of the mud ring for coupling the wiring device to the mud ring 14. In one embodiment shown in FIGS. 5-9, the mounting clip 16 has a main body portion 46 having a substantially U-shape. The body 48 has a bottom end 50 and a top end 52. The bottom end 50 has an open portion 54 forming an axial passage 56 that extends through the longitudinal dimension of the clip 16. The clip member 16 is preferably a one piece integrally formed member made of a spring steel such as pre-tempered stainless steel. A blank of the spring steel is stamped and bent to the desired shape. The material is preferably sufficiently flexible to snap into the mounting holes 44 and to allow the mounting screws to slide into the clip member.

The body 48 has a first portion 58 forming a first leg and a second portion 60 forming a second leg. The first portion 58 and the second portion 60 are substantially parallel to each other and are connected together at a bottom end by a connecting member 62 to form the U-shape. The connecting member 62 allows the legs to bend inwardly when inserted into the opening 44 in the mud ring. The top end of each of the first portion and second portion have an outwardly extending flange 64. The flanges 64 have a dimension and shape supporting the clip member 16 on the mounting flange of the mud ring.

Figure 5:
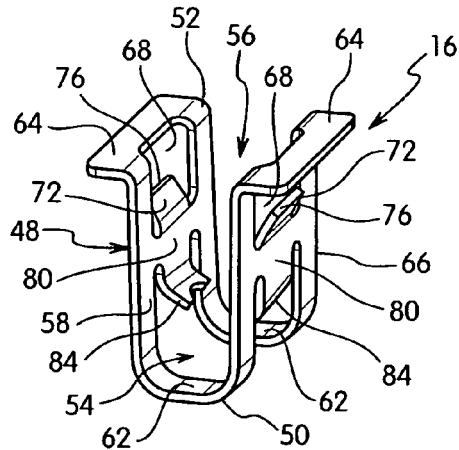
FIG. 5 is a top perspective view of the clip member in a first embodiment of the invention.
Figure 6:
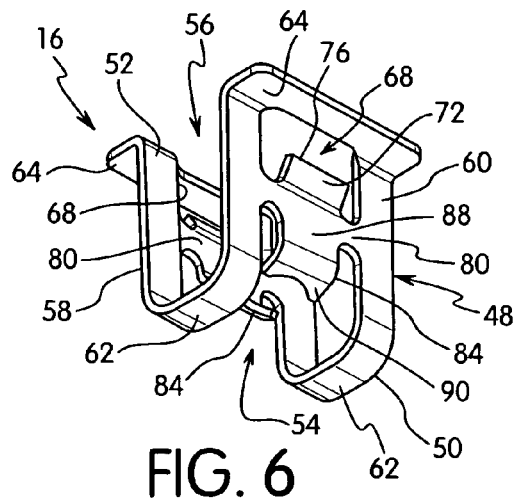
FIG. 6 is a bottom perspective view of the clip member of FIG. 1.

The first portion 58 and the second portion 60 each have a cut out 68 at the top end, and an outwardly extending tab 72. As shown in FIG. 5, the outwardly extending tabs 72 project outwardly at an incline angle with respect to the plane of the first portion 58 and second portion 60 and extend toward the respective top flange 64 and 66. The outwardly extending tabs 72 have a top edge 76 that is spaced from the bottom face of the respective top flange 64 and 66 to define a gap for coupling with the opening in the mounting flange.

Figure 7:
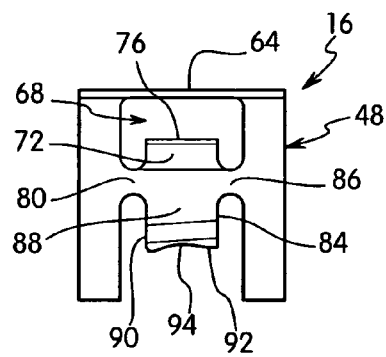
FIG. 7 is a side view of the clip member of FIG. 5.
Figure 8:
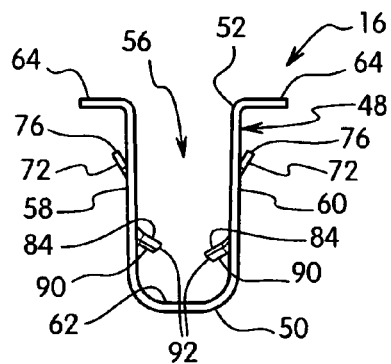
FIG. 8 is an end view of the clip member of FIG. 5.
Figure 9:
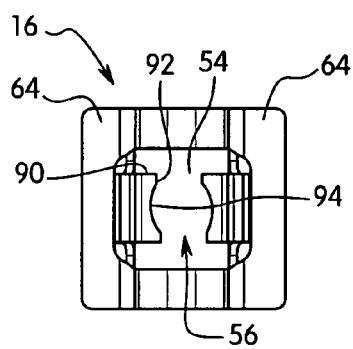
FIG. 9 is a top view of the clip member of FIG. 5.
Figure 10:
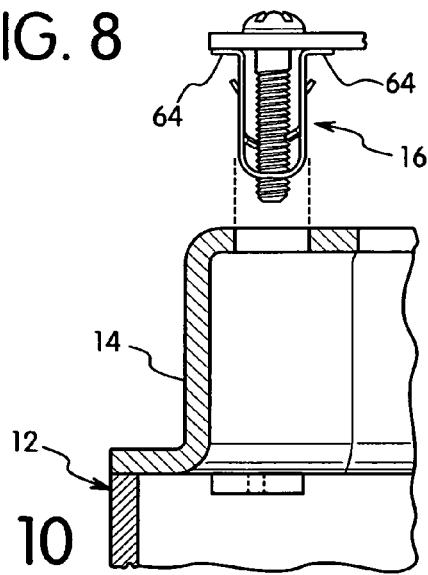
FIG. 10 is a partial cross-sectional view showing the spring clip coupled to the wiring device before coupling to the mud ring.

The open bottom portion 54 and the cut outs 68 in the first and second portions define a cross member 80 as shown in FIG. 7. A downwardly extending tab 84 extends from each of the respective cross member 80. The downwardly extending tabs 84 have a first leg 88 extending substantially parallel to the respective first and second portions, and an inwardly extending second leg 90. The second leg 90 projects inwardly and downwardly towards the bottom end of the main body 48. The distal end 92 of the second leg has a concaved recessed portion 94. As shown in FIG. 9, the second legs 90 extend inwardly into the axial passage 56 so that the concave recessed portions 94 oppose each other. The spacing between the concave recesses 94 corresponds to the diameter of the mounting screws 46 for gripping the screw 46.

Figure 2:
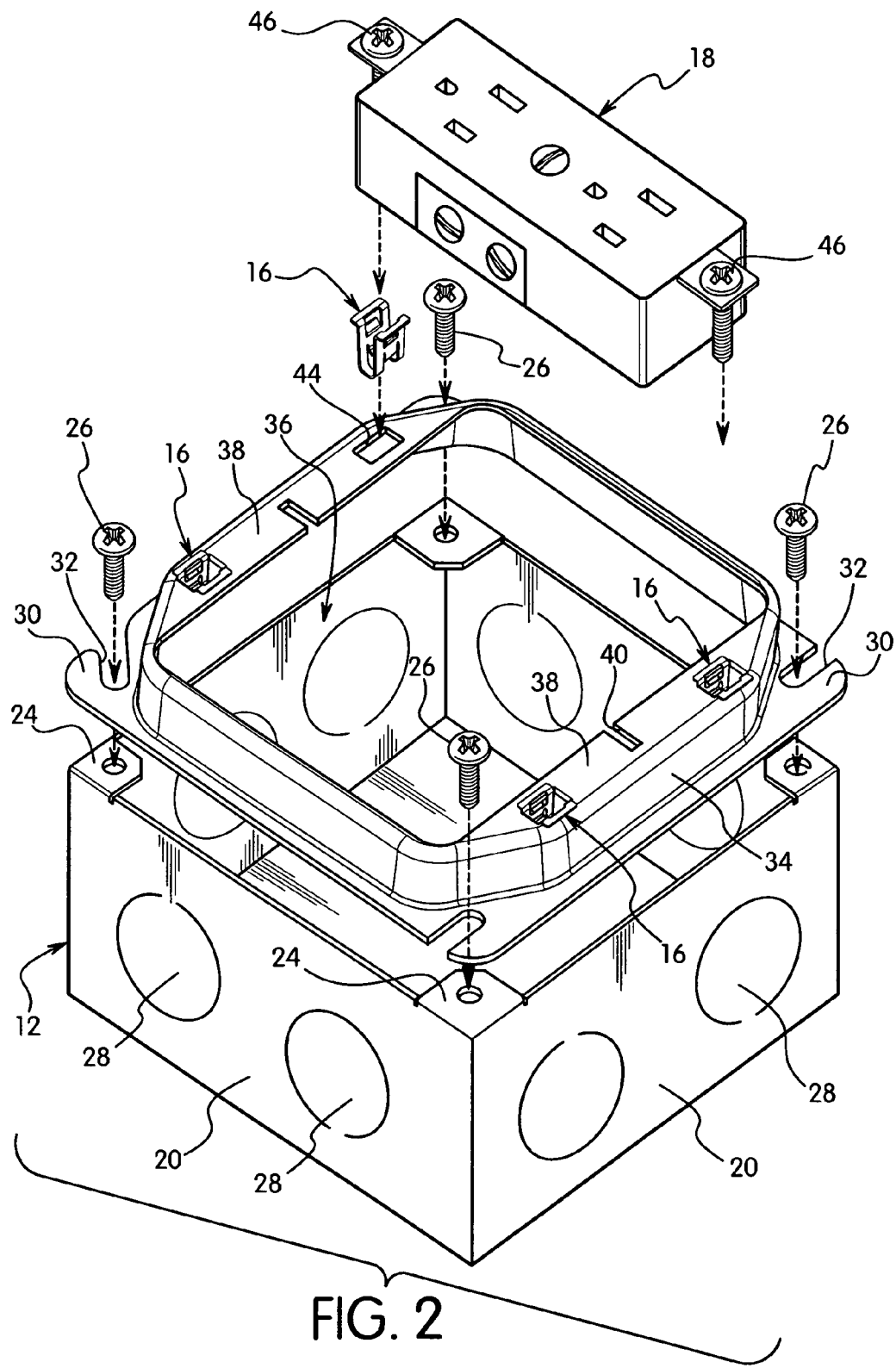
FIG. 2 is an exploded view of the electrical assembly of FIG. 1.
Figure 3:
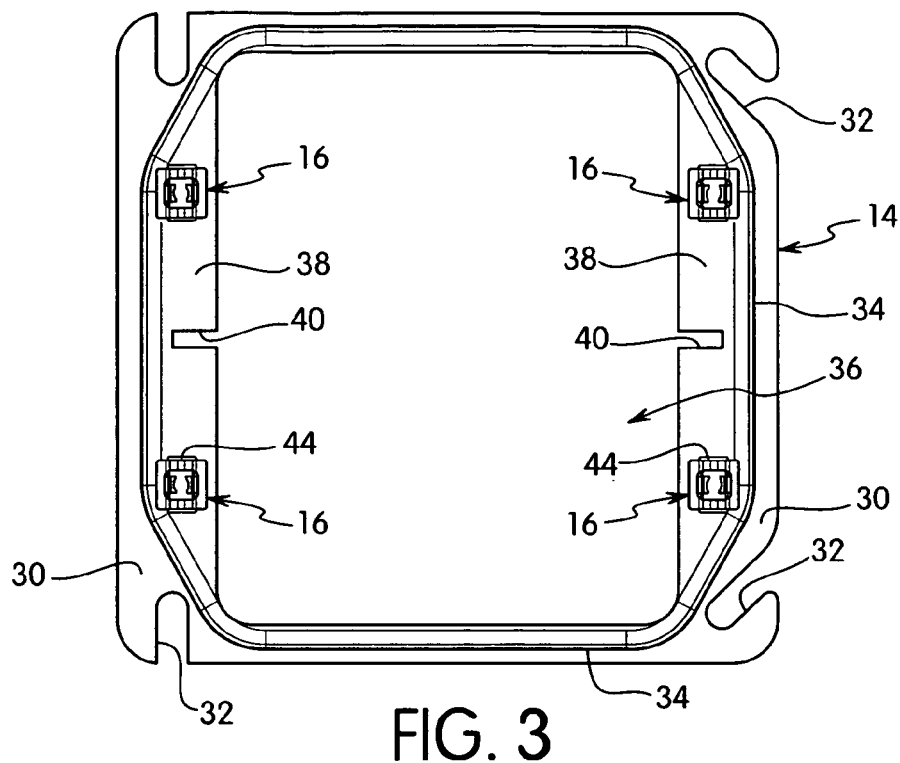
FIG. 3 is a top view of the mud ring and clip member of FIG. 1.
Figure 4:
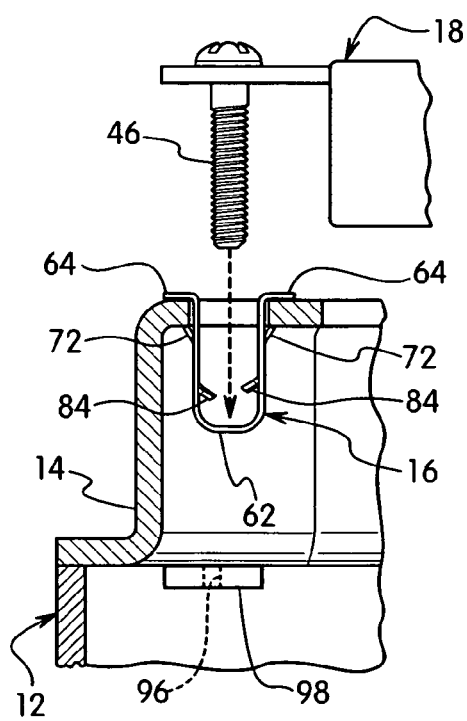
FIG. 4 is an exploded partial cross-sectional view of the electrical assembly of FIG. 1 showing the spring clip coupled to the mud ring.
Figure 4A:
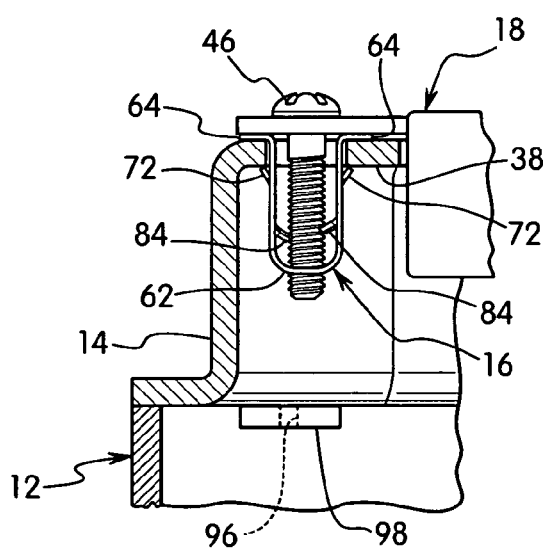
FIG. 4A is a partial cross-sectional view of the electrical assembly showing the mud ring, clip member and mounting screw of the electrical device.

In use, the mounting screws 46 pass through the aperture in the wiring device 18 in a standard mounting fashion. The screws 46 are typically attached to the wiring device by the use of a retainer member. The mounting clip member 46 can be attached to the opening 44 in the mud ring as shown in FIGS. 2-4. The mounting screw 46 is pushed through the axial passage 56 and engages the inwardly extending tabs 84 as shown in FIG. 4A. The mounting clip is preferably made of a spring steel so that the tabs 84 are sufficiently resilient to allow the threads of the mounting screw 46 to slide or ratchet over the inwardly extending tabs 84 to the position shown in FIG. 4. The recessed portion 94 of the tabs 84 engage the screw. The downward angle of the second leg 90 allows the screw to slide between the legs in a downward direction and resists the screw from pulling out in an upward direction. The mounting screw can be separated from the clip by rotating the screw in a counter-clockwise direction. The screw can be rotated in a clockwise direction to thread the screw through the axial passage to seat the wiring device 18 against the top end of the clip member 16 and the mounting surface of the mud ring.

In a preferred embodiment, the mounting clip member 16 first is inserted into the respective hole 44 in the mud ring 14 to attach to the mud ring. As shown in FIG. 4, the outwardly extending tabs 72 are positioned to engage the inner surface of the mounting flange 38 to capture the mounting flange between the top edges of the tabs 72 and the top flange 64. In one embodiment, the mounting screws 46 can have a length to extend to the electrical box and screw into a threaded hole 96 in a mounting tab 98 extending inwardly from the side walls 20 of the electrical box 12.

The mounting clip members 16 are preferably snapped into the holes 44 in the mud ring as shown in FIGS. 3 and 4. The wiring device 16 and the respective screws are then be pushed or threaded through the axial passage of the mounting clip to couple the wiring device to the mud ring. The tabs 84 are sufficiently resilient or flexible to enable the installer to push the screws through the clip members 16 to couple the wiring device to the mud ring.

Figure 11:
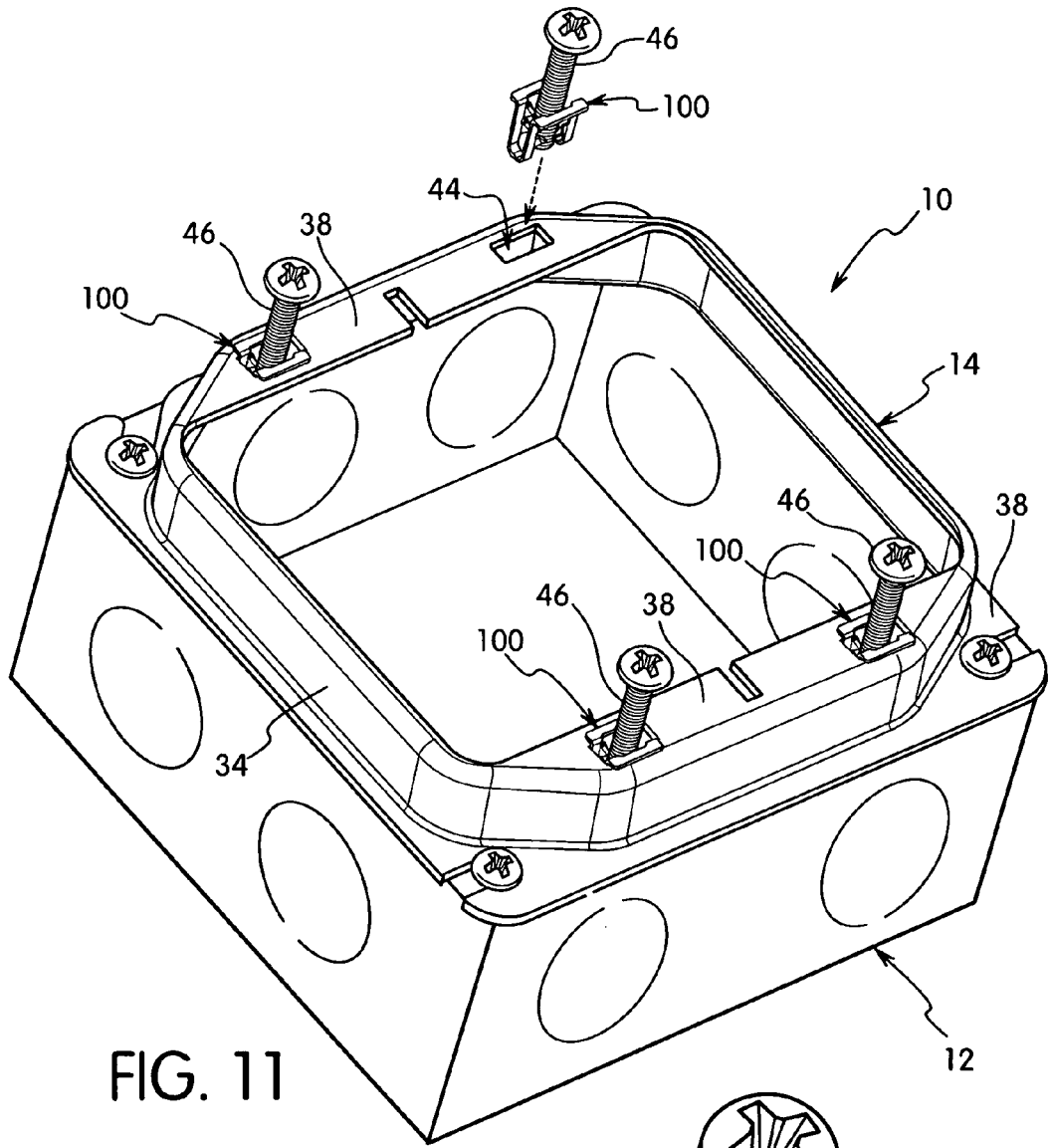
FIG. 11 is a perspective view of the mud ring and spring clip member in a second embodiment of the invention.

In one embodiment, the mud ring 14 or other member for supporting the wiring device 18 is pre-assembled with the clip member 16. The clip member 16 is snapped into the opening 44 in the mud ring 14 and the mud ring is coupled to the electrical box 12. The electrical box 12 and the attached mud ring 14 are mounted to the wall stud and electrical wiring is supplied to the box in a standard manner. The electrician is then able to make the electrical connection with the wiring device and quickly couple the wiring device to the mounting surface of the mud ring by pressing and sliding the mounting screws through the clip member on the mud ring. The mounting screws, if necessary, can be turned to tighten the screws on the clip member and draw the wiring device snug on the mud ring. The tabs 84 of the clip member are angled inwardly and downwardly with respect to the clip member and the electrical box. The edges of the tabs 84 are similarly angled to grip the threads of the mounting screw to couple the wiring device securely to the mud ring and electrical box. In an alternative embodiment, the clip member is pre-assembled with the wiring device which is then snapped into the hole 44 of the mud ring to couple the wiring device to the mud ring as shown in FIG. 11.

Referring to FIGS. 11-19, a second embodiment of the invention is shown. In this embodiment, the electrical box and mud ring are substantially the same as in the first embodiment, and thus, are identified by the same reference numbers. For simplicity, the electrical wiring device is not shown in these Figures, although it will be understood that the wiring device is attached to the mud ring and the electrical box in a manner similar to the previous embodiment.

In this embodiment, the assembly includes a clip member 100 that receives the mounting screw 46 and snaps into the holes 44 in the mud ring 14. In FIG. 11, the mounting screws 46 are shown without the wiring device.

The clip member 100 as shown in FIGS. 15-19 is formed as a one piece unitary member. The spring clip is typically formed of a spring steel material that is stamped and formed to the desired shape. As shown in FIG. 15, clip member 100 has a substantially U-shaped body 102. The body 102 has an open bottom end forming an axial passage 104. The body 102 has a first portion 106 and a second portion 108 coupled together at a bottom end by a connecting portion 110. The first portion 106 and the second portion 108 are able to flex toward each other by bending about the connecting portion 110. The first portion 106 is formed by two parallel legs 112. The second portion 108 is formed by parallel legs 114. The upper end 116 of the first portion 106 includes an outwardly extending flange 118 and the upper end 120 of the second portion 108 includes a flange 122.

Each of the legs have a first tab 124 at the upper end of the body and spaced from the flanges 118 and 122. The first tabs 124 includes a first leg portion 126 that extends inwardly toward the axial passage 104 at a slight angle with respect to the plane of the leg. A second leg portion 128 extends outwardly from the distal end of the first leg portion 126 away from the axial passage. The second leg portion 128 is bent along a diagonal fold line 130. As shown in FIG. 17, the diagonal fold line 130 extends substantially from the base of the first leg portion at a top edge to the distal end of the first leg portion and a bottom edge. The second leg portion 128 is curled outwardly as shown in FIG. 19 so that the diagonal fold line 130 defines the inner portion of the first tabs 124. The first leg portion 126 is bent slightly so the diagonal fold line 130 extends at an inclined angle with respect to the axis of the clip member.

Figure 14:
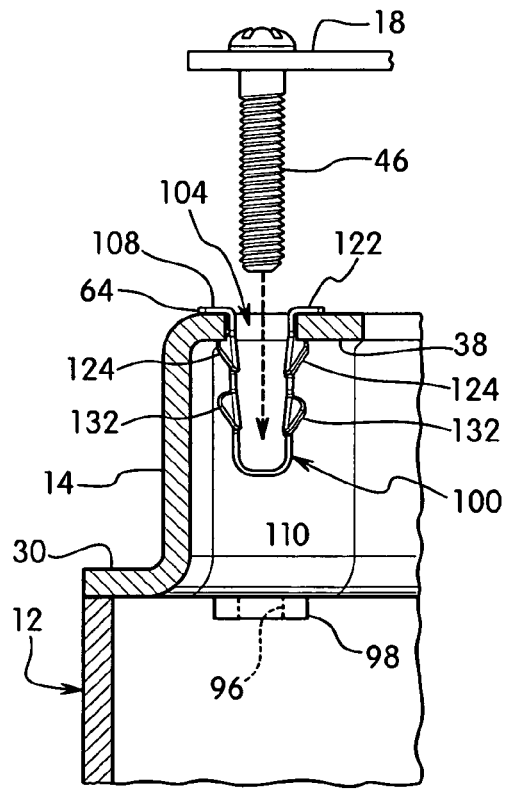
FIG. 14 is an exploded partial cross-sectional view of the electrical box, mud ring and the clip member taken along line 14-14 of FIG. 13.

A second tab 132 is formed on each of the legs 112 and 114 and spaced below the first tabs towards the bottom end of the body. The second tabs 132 are bent to have a form substantially the same as the first tabs 124. The second tabs 132 have a first leg portion 134 extending inwardly towards the axial passage and a second leg portion 136 bent outwardly with respect to the first leg portion along a diagonal fold line 138. As shown in FIG. 14, the first leg portion 126 and 134 are twisted slightly out of the plane of the legs 112 and 114 of the body 102 so that the bottom edge 140 of the first fold line 130 and the bottom edge 142 of the second diagonal fold line 138 project inwardly towards the axial passage 104.

Figure 12:
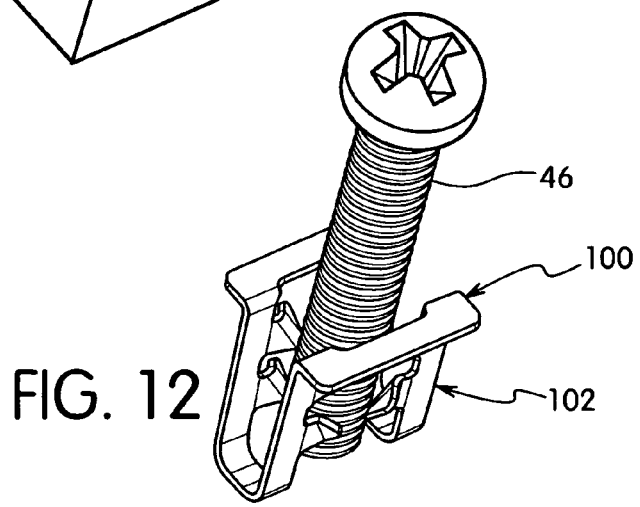
FIG. 12 is an enlarged perspective view of the clip member and mounting screw of FIG. 10.
Figure 13:
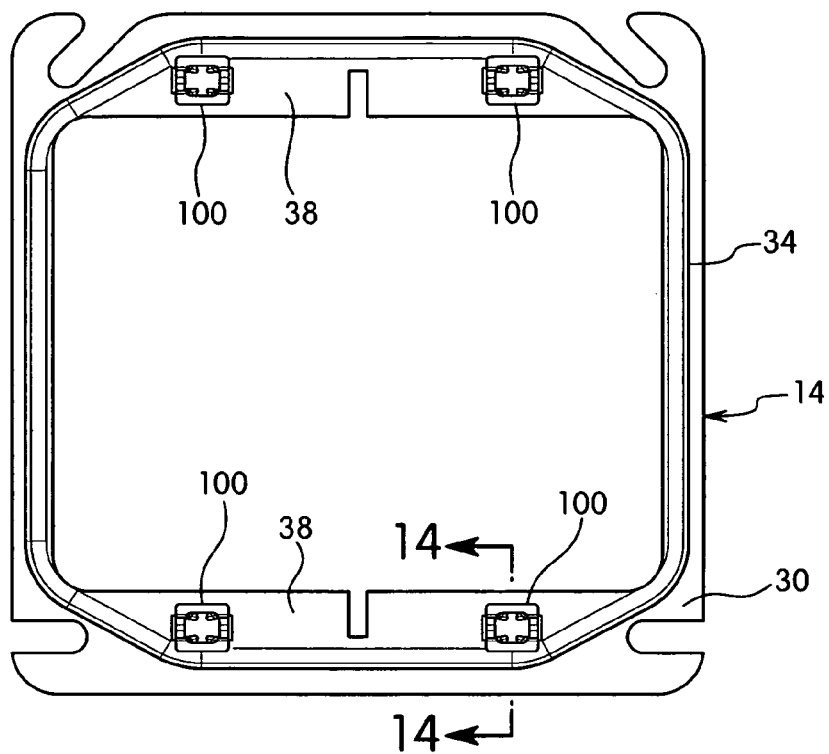
FIG. 13 is a top view of the mud ring clip member of FIG. 10.
Figure 14A:
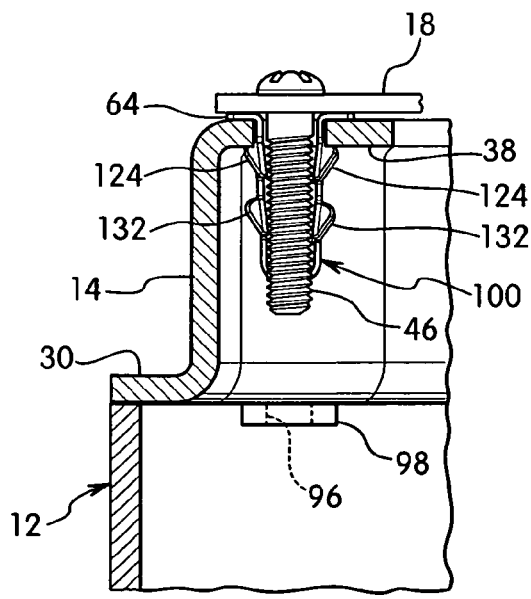
FIG. 14A is a partial cross-sectional view of the mud ring and clip of FIG. 13 showing the mounting screw of the electrical device.

The clip member 100 is coupled to the mud ring in a manner similar to the previous embodiment. The tabs 124 are sufficiently resilient to snap into the opening 44 of the mud ring and couple to the mud ring as shown in FIGS. 14 and 14A. The mounting screw can be passed through the axial passage 104 so that the threads of the screw slide or ratchet over the bottom, inner edges of the resilient tabs 124 and 132. As shown in FIG. 12, the threads of the mounting screw engage the bottom edges 140 and 142 of the tabs 124 and 132 to allow the screws to slide past the tabs through the axial passage while engaging the threads so that the screws can be removed only by unscrewing the screws from the clip member. As shown in FIG. 19, the tabs 124 and 132 extend inwardly to engage the screw.

The clip member can be inserted into the opening in the mounting flange of the mud ring as shown in FIGS. 11 and 14. The clip member snaps into the opening so that the upper edge of the second leg 128 engages the bottom surface of the mounting flange of the mud ring to couple the clip member to the mud ring as shown in FIG. 14. As in the previous embodiment, the clip member can be attached to the mounting screws of the wiring device as a preassembled unit and then snapped into the opening in the mud ring.

The clip member of the invention allows preassembly with the mud ring or the wiring device. The wiring device can be coupled to the mud ring by sliding the mounting screws through the clip member and then rotating the screws to tighten the wiring device against the mud ring. The clip member and the mud ring being provided as a pre-assembled unit enables the electrician to quickly couple the electrical wiring device to the mud ring by pressing the mounting screws through the clip member. The preassembled unit of the wiring device and the clip member can be quickly and easily snapped into the openings in the mounting flange of the mud ring. The openings in the mounting flange of the mud ring are aligned with the mounting holes in the electrical box. If needed, the mounting screws of the wiring device can then be threaded easily into the threaded hole in the electrical box to couple the wiring device directly to the electrical box.

While various embodiments have been chosen to illustrate the invention, it will be understood by those skilled in the art that various changes and modifications can be made without departing from the spirit and scope of the invention as defined in the appended claims.

What is claimed is:

1. A preassembled electrical device comprising:
   a mud ring having a mounting flange with a mounting hole therein; and
   a one piece clip member received in the mounting hole and having an axial passage adapted for receiving a mounting screw of an electrical wiring device, and a first leg portion with an outwardly extending tab extending outwardly with respect to said axial passage coupled to the mounting flange within said mounting hole in the mud ring and said first leg portion having at least one inwardly extending tab extending inwardly with respect to said axial passage for engaging the mounting screw of the electrical wiring device.

2. The electrical device of claim 1, wherein
   said clip member has a second leg portion coupled to said first leg potion to form a substantially U-shaped body with said axial passage adapted for receiving said mounting screw, an inwardly extending tab on said first leg portion and second leg portion for coupling with said mounting screw, and
   an outwardly extending tab on said first leg portion and second leg portion and extending outwardly with respect to said axial passage for coupling with said mounting hole in said mud ring.

3. The electrical device of claim 2, further comprising
   an electrical box having a mounting tab with a threaded hole for receiving said mounting screw and where said clip member and mounting hole in said mounting flange are aligned with said threaded hole.

4. The electrical device of claim 2, wherein
   said first leg portion and second leg portion of said clip member each comprise a first and a second spaced-apart leg and a cross member extending between said first and second legs, said outwardly extending tab projecting outwardly with respect to said axial passage from a top edge of said cross member and said inwardly extending tab projecting inwardly into said axial passage from a bottom edge of said cross member.

5. The electrical device of claim 2, wherein
   said first leg portion and second leg portion of said clip member each have a first and a second spaced-apart leg, said outwardly extending tab and inwardly extending tab projecting from said first leg.

6. The electrical device of claim 5, wherein
   each of said first and second legs have at least one of said outwardly extending tabs extending outwardly with respect to said axial passage and have at least one of said inwardly extending tabs.

7. The electrical device of claim 1, wherein
   said clip member has a top end with a flange extending outwardly with respect to said axial passage.

8. The electrical device of claim 1, wherein said mud ring has a bottom plate for coupling to an open end of an electrical box.

9. The electrical device of claim 2, wherein said first leg portion is coupled to said second portion by a connecting member at a bottom end.

10. The electrical device of claim 2, wherein said first leg portion and second leg portion each comprise a first and second spaced-apart leg, said first leg of said first portion being coupled to said first leg of said second portion by a connecting member at a bottom end, and said second leg of said first portion being coupled to said second leg of said second portion by a connecting member at a bottom end, wherein said axial passage extends between said bottom portions.

11. An electrical assembly comprising:
an electrical box having an open end;
a mounting member adapted for coupling to said open end of said electrical box, said mounting member having a flange with a mounting hole therein;
a clip member received in said mounting hole and coupled to said flange, said clip member having an axial passage and a U-shaped body with a first portion and second portion, each said first portion and second portion having a tab extending into said axial passage adapted for coupling with a mounting screw of an electrical wiring device to couple the mounting screw to said mounting member, said first portion and second portion having an outwardly extending tab extending outwardly with respect to said axial passage for coupling with said mounting hole in said flange.

12. The electrical assembly of claim 11, further comprising:
an electrical device having a mounting screw received in said axial passage of said clip member for coupling said electrical device to said mounting member.

13. The assembly of claim 11, wherein said clip member is coupled to said mounting member to form a preassembled unit, and where said mounting screw of said electrical device is adapted for coupling to said clip member.

14. The assembly of claim 13, wherein said clip member being adapted for snapping into said mounting hole in said mounting member.

15. The assembly of claim 11, wherein each said first portion and second portion have a first leg, second leg and a cross member extending between said first and second legs, and where said inwardly extending tab projects from a bottom edge of said cross member and said outwardly extending tab projects from a top end of said cross member.

16. The assembly of claim 11, wherein each said first portion and second portion have a first leg and a spaced-apart second leg, and where said outwardly extending tab projects outwardly from said first leg and said inwardly extending tab extends inwardly from said first leg.

17. The assembly of claim 16, wherein said second leg has an inwardly extending tab for coupling with said mounting screw and an outwardly extending tab for coupling with said aperture in said mounting member.

18. The assembly of claim 11, wherein said first portion and second portion have an outwardly extending flange at a top end, and where said clip member is adapted to snap into said mounting hole in said mounting member.

19. A one piece integrally formed mounting clip member adapted for mounting an electrical wiring device, said clip member comprising:
a substantially U-shaped body having a first portion and a second portion, each said first portion and second portion having a top end and bottom end, a connecting portion extending between said bottom end of said respective first and second portions, and an axial passage extending between said first and second portions;
a top flange member extending outward with respect to said axial passage from the top end of each of said first and second portions;
at least one outwardly extending tab on said first portion adapted for coupling said mounting clip member with a mounting hole in a support surface for supporting an electrical wiring device, said outwardly extending tab extending outwardly with respect to said axial passage; and
at least one inwardly extending tab on said first portion extending into said axial passage and adapted for coupling a screw extending through said axial passage of said mounting clip member.

20. The mounting clip member of claim 19, wherein said first portion and second portion have a first leg, a second leg, and a cross member extending between said first and second legs, and where said at least one outwardly extending tab projects outwardly from a top edge of said cross member and said inwardly extending tab projects inwardly from a bottom edge of said cross member.

21. The mounting clip member of claim 19, wherein said first portion and second portion have a first leg and a second leg parallel to said first leg, a first of said at least one inwardly extending tabs projecting inwardly from said first leg and a second of said at least one inwardly extending tabs projecting inwardly from said second leg; and
a first of said at least one outwardly extending tabs projects outwardly from said first leg and a second of said at least one outwardly extending tabs projects outwardly from said second leg.

22. The mounting clip member of claim 19, further comprising
an electrical wiring device having a mounting screw, said mounting screw being received in said axial passage to couple said mounting screw to said mounting clip member.

23. The mounting clip member of claim 19, further comprising
an electrical box and mud ring having a mounting surface adapted for supporting an electrical wiring device, said mounting surface having a mounting hole receiving said mounting clip member.

24. A method of assembling an electrical assembly, said method comprising the steps of:
coupling said mounting clip member of claim 19 in a mounting hole in a mounting surface of an electrical box and mud ring assembly where said at least one outwardly extending tab is coupled to an inner edge of said mounting hole; and
providing an electrical wiring device having a mounting screw and inserting said mounting screw into said axial passage of said mounting clip member to couple said electrical wiring device to said mounting surface.

* * * * *